United States Patent [19]

Anders et al.

[11] Patent Number: 4,586,180
[45] Date of Patent: Apr. 29, 1986

[54] MICROPROCESSOR FAULT-MONITORING CIRCUIT

[75] Inventors: Horst-Günther Anders; Rudolf Diepold-Scharnitzky, both of Berlin, Fed. Rep. of Germany

[73] Assignee: Siemens Aktiengesellschaft, Munich, Fed. Rep. of Germany

[21] Appl. No.: 469,628

[22] Filed: Feb. 25, 1983

[30] Foreign Application Priority Data

Feb. 26, 1982 [DE] Fed. Rep. of Germany ....... 3207633

[51] Int. Cl.⁴ .................................. G06F 11/00
[52] U.S. Cl. ........................... 371/14; 371/62; 371/12; 377/28; 364/900
[58] Field of Search ............ 371/62, 14, 61, 25, 371/12; 377/28, 31, 44; 364/200, 900

[56] References Cited

U.S. PATENT DOCUMENTS

| 3,566,368 | 2/1971 | De Blauw | 364/200 |
| 3,749,897 | 7/1973 | Hirvela | 371/62 X |
| 3,795,800 | 3/1974 | Nimmo | 371/62 X |
| 4,072,852 | 2/1978 | Hogan et al. | 364/900 X |
| 4,321,666 | 3/1982 | Tasar et al. | 371/62 X |
| 4,405,892 | 10/1983 | Ruhnau et al. | 371/62 X |

FOREIGN PATENT DOCUMENTS 56-137450 10/1981 Japan.

OTHER PUBLICATIONS

SIEMENS TELEPERM C Computer Module M74005-A8810, 2 pages.

*Primary Examiner*—James D. Thomas
*Assistant Examiner*—David L. Clark
*Attorney, Agent, or Firm*—Kenyon & Kenyon

[57] ABSTRACT

A circuit is disclosed for fault-monitoring a microprocessor. The circuit includes an oscillator having an output signal of the same frequency as a test signal output of the microprocessor. The circuit also includes a binary counter. The microprocessor test output is coupled to the reset input of the counter and the oscillator is coupled to the counting input of the counter. The counter counts when the test signal does not correspond in frequency to the oscillator signal. A lower order output signal of the counter is used as a reset for the microprocessor and a higher order output of the counter is used to generate a fault indicating signal if the microprocessor has not resumed correct operation and to inhibit the microprocessor. The oscillator is coupled to the counting input of the counter through a logic circuit. The two outputs of the counter are coupled to another logic circuit which supplies the reset and inhibit signals to the microprocessor. A fault indicator is also coupled to the higher order output of the counter. The invention is advantageous in that only a small amount of circuitry is required to provide the monitoring functions disclosed herein.

5 Claims, 4 Drawing Figures

MICROPROCESSOR FAULT-MONITORING CIRCUIT

BACKGROUND OF THE INVENTION

The present invention relates to a fault-monitoring circuit for a microprocessor.

DE-OS 29 46 081 discloses a microprocessor fault-monitoring circuit in which a clear signal is provided by the microprocessor after each complete program run of the microprocessor. An oscillator provides a clock signal of predetermined frequency which is fed to a count-down binary counter. At the end of each program cycle, the counted-down count of the counter is compared to a predetermined count to determine whether the program run was fault free.

Computer Module M74005-A 8810 (Siemens TELEPERM C System) includes a microprocessor having a test signal output connected to the trigger input of a monostable multivibrator. If the timing of the test signal provided by the microprocessor to the trigger input of the monostable multivibrator is not correct, the monostable multivibrator is not triggered and "times out", thereby providing a level change at the output of the monostable multivibrator. The multivibrator output is coupled to the microprocessor reset input and the level change not only resets the microprocessor, but is also used as a fault indication to indicate that the program cycle of the microprocessor did not proceed correctly.

U.S. Pat. No. 4,072,852 discloses a computer monitoring system in which periodic test pulses are generated by the central processing unit of the computer at the same frequency as the clock signal of an oscillator. An additional address code of the central processing unit is however required in order to carry out a monitoring sequence and additional circuitry is required to decode the address.

OBJECTS AND SUMMARY OF THE INVENTION

It is an object of the present invention to provide a circuit for monitoring a microprocessor.

It is another object of the present invention to provide such a circuit with a minimum amount of circuitry.

It is another object of the present invention to provide a fault-monitoring circuit for a microprocessor which after detecting a fault can provide a reset to the microprocessor or inhibit the microprocessor if the fault persists.

The above and other objects are achieved by the invention disclosed herein according to which a reference signal is compared in frequency with a test signal provided by a microprocessor. A difference in the frequencies of the two signals is indicative of a fault in the microprocessor. In accordance with an aspect of the invention, the microprocessor can reset and continue to run if the fault persists for less than a predetermined time, otherwise the microprocessor will be inhibited and prevented from continuing.

According to a preferred embodiment, frequency comparison is provided by a counter to which the two signals are supplied. The reference signal is provided as a clock signal to the counting input of the counter and the microprocessor test signal is provided to the reset input of the counter. If the counter is not reset by the microprocessor test signal for each clock pulse supplied to the counting input, the counter is permitted to count and provides an output indicative of a fault.

In accordance with a preferred embodiment, a fault-monitoring circuit is provided in which a clock oscillator of predetermined frequency is coupled to the counting input of the counter and the microprocessor test output is coupled to the reset input of the counter. One output of the counter is coupled to the input of a first logic circiut and the output of the first logic circuit is coupled to an input of the microprocessor. Another counter output is coupled to another input of the first logic circuit and also preferably to a fault indicator. A second logic circuit is provided between the oscillator and the counter, the oscillator being coupled to one input of the second logic circuit, the second counter output being coupled to another input of the logic circuit, and the output of the logic circuit being coupled to the counting input of the counter. The first logic circuit provides a reset signal to the microprocessor in response to the one output of the counter and an inhibit or disable signal to the microprocessor in response to the other output of the counter. A fault indication is also given in response to the other output of the counter and the monitoring circuit is latched or locked. The test signal output of the microprocessor can be its synchronizing output.

In order to allow the microprocessor sufficient time to reset in the event of a temporary disturbance, the second counter output is selected to provide an output signal a predetermined time after the first counter output provides an output signal. Preferably, the two counter outputs are not from adjacent counting stages.

It is further preferred that a four bit binary counter be used and that the first and second outputs be the second and fourth bit outputs, respectively, although other outputs of the binary counter can be used.

To manually reset a latched circuit which continually provides a rest (inhibit) signal to the microprocessor, a switch is connected to the logic cirucit so that the reset input to the microprocessor can be reset.

One advantage of the invention is that a reset signal is provided to the microprocessor a short time after the test signal output of the microprocessor changes, indicative of a fault but without a fault indication being given. If proper operation is resumed within a predetermined time, i.e. if the test signal output of the microprocessor is restored to its proper condition, no fault indication is given and the microprocessor and the monitoring circuit continue to function. If the fault persists after the predetermined time, i.e. the microprocessor is not restarted or not restarted properly and the microprocessor test signal remains different from the oscillator signal, then a fault indication is given and the microprocessor is inhibited or disabled by an appropriate signal applied to its reset input.

Another advantage of the invention is that such monitoring operation is achieved with a relatively small amount of circuitry.

In the circuit according to the invention, the logic circuits may take different forms. However, an OR gate is preferred.

The above and other objects, features, aspects and advantages of the present invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts or signals and in which.

DESCRIPTION OF THE PREFERRED EMBODIMENTS

Figure 1:
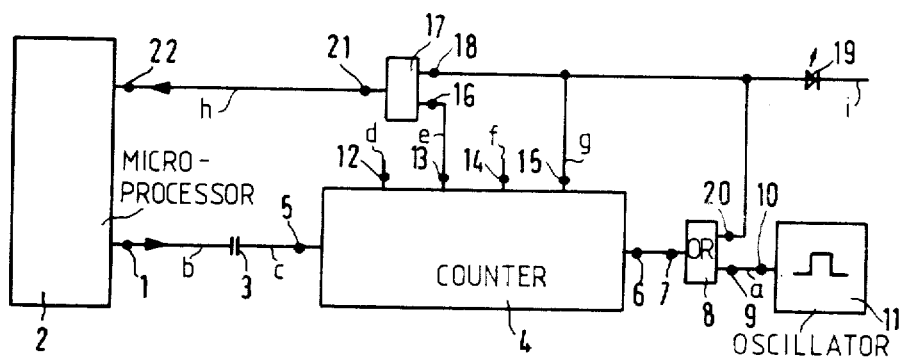
FIG. 1 is a block diagram of a monitoring circuit according to the invention.

Referring first to FIG. 1, the output 1, e.g. the synchronizing output, of a microprocessor 2 is coupled to the reset (or clear) input 5 of a binary counter 4 through a capacitor 3 to provide test signals to the counter. The output 7 of a logic circuit 8 is coupled to the counting input 6 of the counter 4. The logic circuit 8 in the illustrated embodiment is an OR gate. The output 10 of a clock oscillator 11 is coupled to the input 9 of the OR gate 8. In the illustrated embodiment, the counter 4 is a four bit binary counter and has four outputs 12, 13, 14 and 15. Output 12 can be a divide-by-two, output 13, a divide-by-four, output 14, a divide-by-eight, and output 15, a divide-by-16, although other divisions can be used. The counter output 13 corresponding to the second bit (divide-by-four) of the counter is connected to one input 16 of a further logic circiut 17. In the illustrated embodiment, logic circuit 17 is also an OR gate. The counter output 15 (divide-by-16) of the fourth bit of the counter is coupled to the other input 18 of the OR gate 17. In addition, counter output 15 is coupled to a signal generator designated 19 and to the other input 20 of OR gate 8. The output 21 of the OR gate 17 is coupled to the reset input 22 of the microprocessor 2. The signal generator 19, can be, for example, an LED coupled to ground through a limiting resistor.

Figure 2:
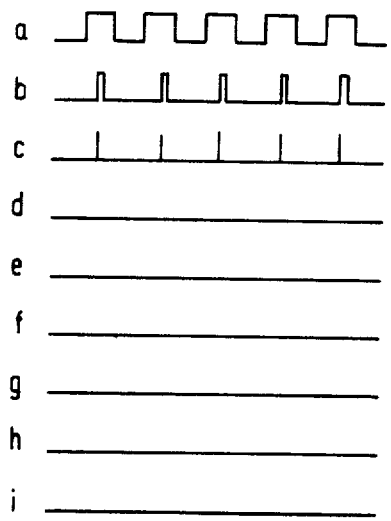
FIG. 2 is a timing diagram of signals a–i of the circuit of FIG. 1 for a fault-free microprocessor run.
Figure 3:
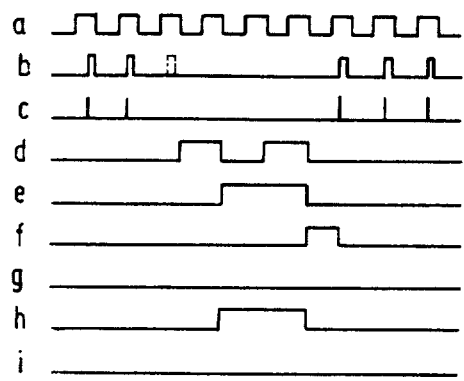
FIG. 3 is a timing diagram of signals a–i of the circuit of FIG. 1 for a microprocessor run during which a correctable fault occurs.
Figure 4:
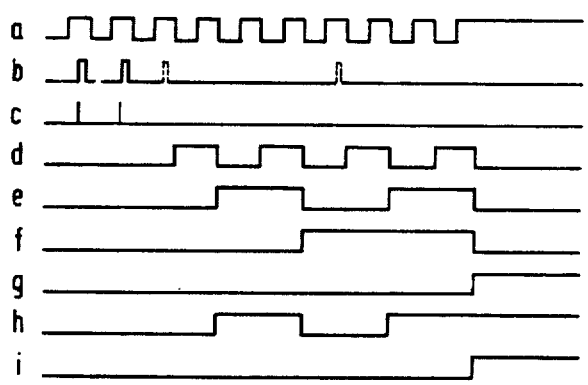
FIG. 4 is a timing diagram of signals a–i of the circuit of FIG. 1 for a microprocessor run during which a non-correctable fault occurs.

Operation of the circuit illustrated in FIG. 1 will be described with reference to the timing diagrams of FIGS. 2–4. In FIGS. 2–4 "a" is the clock pulse output signal of oscillator 11; "b" is the test signal output from output 1 of microprocessor 2; "c" is the input signal to the input 5 of counter 4; "d"–"g" are the first to the fourth bit signals present at the first-fourth counter outputs 12-15, respectively; "h" is the signal at the reset input 22 of microprocessor 2; and "i" is the signal at the signal generator 19 output.

Referring first to FIGS. 1 and 2, the clock output pulses "a" of oscillator 11 are fed to the input 9 of OR gate 8. The frequency of the clock pulse output signal "a" of the oscillator 11 is chosen so that it corresponds to the frequency of the test signal "b" appearing at the output 1 of the microprocessor. For an error free program cycle, the pulse signal "b" (and the signal "c" derived from signal "b") corresponds in frequency with the clock pulse signal "a" of the oscillator 11, as depicted in FIG. 2. With such a correspondence, the binary counter 4 cannot count beyond a "0" count because it is immediately reset by the signal "c" derived from the test signal "b". As a result, the signal "d" appearing at the first bit output 12 of the binary counter 4 is a logical "0" and the signals "e"–"f" appearing at the other outputs 13 to 15, respectively, are also logical "0"s. Since the inputs to OR gate 17 are logical "0"s, its output (signal "h") is a logical "0". The signal generator 19 provides a logical "0" output (signal "i") indicating that the program cycle is error-free.

If, on the other hand, as shown in FIG. 3, one or more pulses of the test signal "b" are not present, the binary counter 4 is not reset because the input signal "c" to the counter which correspondingly is missing pulses, does not reset the counter. Thus, the counter proceeds to count output clock pulses "a" from the oscillator 11 and the divide-by-two pulses "d" appear at the first bit output 12 of the counter 4. Pulses "e" and "f" also appear at the second and third bit outputs 13 and 14, respectively, of the counter 4 corresponding to the number of pulses missing from the test signal "b". With pulse signals present at the inputs of the OR gate 17, a pulse is provided at the output of OR gate 17 as a reset signal "h" to the reset input 22 of the microprocessor. The microprocessor then resets and if it generates a signal "b" so that signal "c" again corresponds with the oscillator signal "a", the binary counter 4 is reset by the singal "c" to bring all of the counter outputs back to their logical "0" starting state. In this case, the microprocessor is reset and properly restarted, i.e. the fault corrected, before the counter counted a number of oscillator pulses necessary to provide a pulse output at the fourth bit (divide-by-16) counter output 15. As a result, the signal generator 19 does not respond and its output signal "i" remains a logical "0".

Referring to FIG. 4, the same error sequence described with respect to FIG. 3 occurs to the point that a reset signal "h" is fed to the reset input 22 of the microprocessor. However, if the microprocessor does not respond to this reset signal to restore the test signal "b", as shown for example in FIG. 4, the binary counter 4 continues to count until the fourth bit counter output 15 is set to a logical "1" ("g" in FIG. 4). A logical "1" signal is accordingly fed to the reset input 22 of the microprocessor 2. In addition, the logical "1" output of counter output 15 causes the output of OR gate 8 to be a logical "1" so that oscillator pulses no longer appear at the input 6 of the counter, and the counter 4 stops counting. This causes the counter output 15 to remain at a constant logical "1" which causes a constant logicl "1" to be applied to the reset input 22 of the microprocessor. In this situation, the circuit is "locked" and the microprocessor 15 prevented from continuing any program. A constant logical "1" is also delivered to the signal generator 19 (e.g. the LED illuminates), which indicates a fault in the microprocessor 2 which cannot be corrected.

The circuit can be "unlocked", for example, by connecting a switch, not shown in FIG. 1, to the output 15 of the counter to temporarily set the input 18 of OR gate 17 and the input 20 of OR gate 8 to a logical "0", so that the microprocessor will be enabled and pulses "a" of the oscillator 11 will be gated through the OR gate 8 to the counter. The switch can be a single pole, two position switch having one terminal connected to output 15 of the counter and the other terminal connected to ground.

Certain changes and modifications of the embodiments of the invention disclosed herein will be readily apparent to those skilled in the art. It is the applicants' intention to cover by their claims all those changes and modifications which could be made to the embodiments of the invention herein chosen for the purpose of disclosure without departing from the spirit and scope of the invention.

What is claimed is

1. A circuit arrangement for monitoring the program operation of a computer means comprising binary counter means having a counting input, a reset input and a plurality of outputs, the reset input being coupled to an output of the computer means, and further including oscillator means, said plurality of outputs of said counter means comprising a lower order output and a higher order output, said lower order and higher order outputs being coupled to respective first and second inputs of first logic circuit means, an output of said logic circuit means being coupled to a reset input of said computer means, said output of said computer means comprising a test signal, the frequency of said test signal being substantially the same as the frequency of the output of said oscillator means when said computer means is functioning properly, and further comprising second logic circuit means having two inputs and an output, the output of said oscillator means being coupled to a first input of said second logic circuit means, the output of said second logic circuit means being coupled to said counting input of said counter means, said higher order output being further coupled to the second input of said second logic circuit means, so that if said lower order output attains a logic one condition, said computer means will be reset and if said higher order output attains a logic one condition, said computer means will be reset and said counter means will be disabled, thereby retaining said logic one condition at said higher order output, thus placing said computer means in a locked condition so that no further operation of said computer means can occur, and further comprising means for generating a fault indication signal coupled to said higher order output of said counter means for indicating a locked condition.

2. The circuit arrangement recited in claim 1 wherein said first and second logic circuits comprise OR gates.

3. The circuit arrangement recited in claim 1 wherein said lower order and higher order outputs are non-adjacent outputs of said counter means.

4. The circuit arrangement recited in claim 1 wherein said counter means is a four bit binary counter and said lower order output is the second bit output and said higher order output is said fourth bit output.

5. The circuit arrangement recited in claim 1 further comprising switch means coupled to said higher order output of said counter means for temporarily disabling said output so that said computer means can be unlocked after said computer means goes into a locked state.

* * * * *